(12) United States Patent
Byrne et al.

(10) Patent No.: US 11,424,561 B2
(45) Date of Patent: Aug. 23, 2022

(54) OUTLET-LEVEL ELECTRICAL ENERGY MANAGEMENT SYSTEM

(71) Applicants: Norman R. Byrne, Ada, MI (US);
Timothy J. Warwick, Sparta, MI (US);
Daniel P. Byrne, Lowell, MI (US);
Robert Craig Klem, Rockford, MI (US); Roger D. Burdi, Grand Rapids, MI (US)

(72) Inventors: Norman R. Byrne, Ada, MI (US);
Timothy J. Warwick, Sparta, MI (US);
Daniel P. Byrne, Lowell, MI (US);
Robert Craig Klem, Rockford, MI (US); Roger D. Burdi, Grand Rapids, MI (US)

( * ) Notice: Subject to any disclaimer, the term of this patent is extended or adjusted under 35 U.S.C. 154(b) by 0 days.

(21) Appl. No.: 16/917,076

(22) Filed: Jun. 30, 2020

(65) Prior Publication Data

US 2021/0005989 A1 Jan. 7, 2021

Related U.S. Application Data

(60) Provisional application No. 62/870,101, filed on Jul. 3, 2019.

(51) Int. Cl.
*H01R 12/51* (2011.01)
*H01R 13/66* (2006.01)
(Continued)

(52) U.S. Cl.
CPC ........... *H01R 12/515* (2013.01); *H01H 83/00* (2013.01); *H01R 13/6683* (2013.01); *H01R 13/713* (2013.01)

(58) Field of Classification Search
CPC .. H01R 12/51; H01R 12/515; H01R 13/6683; H01R 13/713; H01R 13/66; H01H 83/00; H04M 1/62
(Continued)

(56) References Cited

U.S. PATENT DOCUMENTS 2,234,982 A 3/1941 Ross
2,573,920 A 11/1951 McLeod
(Continued)

FOREIGN PATENT DOCUMENTS

CN 201156727 Y 11/2008
CN 201570900 9/2010
(Continued)

OTHER PUBLICATIONS

Power Integrations, Inc., "Tiny Switch Flyback Design Methodology—Application Note AN-23," dated Jul. 1999.
(Continued)

*Primary Examiner* — Yemane Mehari
(74) *Attorney, Agent, or Firm* — Gardner, Linn, Burkhart & Ondersma LLP (57) ABSTRACT

An electrical receptacle includes a printed circuit board (PCB), a power control unit coupled to the PCB, AC electrical conductors, and an electrical receptacle coupled to the PCB. The electrical contacts are in electrical communication with respective ones of the electrical conductors. A first portion of each electrical conductor is coupled to a power source and a second portion of each electrical conductor is coupled to respective ones of the electrical contacts. The power control unit includes a controller and a switch, the switch operable to selectively establish continuity between the first and second portions of at least one of the electrical conductors. The controller is configured to selectively place the switch into either a closed position or an open position in response to a signal received from an environmental or occupancy sensor.

16 Claims, 5 Drawing Sheets

(51) Int. Cl.
*H01R 13/713* (2006.01)
*H01H 83/00* (2006.01)

(58) Field of Classification Search
USPC .......................................................... 361/5
See application file for complete search history.

(56) References Cited

U.S. PATENT DOCUMENTS

| | | |
|---|---|---|
| 3,214,734 A | 10/1965 | Whitehead |
| 3,339,079 A | 8/1967 | Kessler |
| 3,363,214 A | 1/1968 | Wright |
| 3,521,216 A | 7/1970 | Tolegian |
| 3,766,434 A | 10/1973 | Sherman |
| 3,786,391 A | 1/1974 | Mathauser |
| 3,808,577 A | 4/1974 | Mathauser |
| 3,810,258 A | 5/1974 | Mathauser |
| 3,813,579 A | 5/1974 | Doyle et al. |
| 3,944,891 A | 3/1976 | McDonald et al. |
| 3,993,977 A | 11/1976 | Gilbert |
| 3,994,552 A | 11/1976 | Selvin |
| 4,004,298 A | 1/1977 | Freed |
| 4,023,073 A | 5/1977 | Georgi |
| 4,112,941 A | 9/1978 | Larimore |
| 4,161,727 A | 7/1979 | Thilo et al. |
| 4,175,238 A | 11/1979 | Breimesser et al. |
| 4,370,562 A | 1/1983 | Palazzetti et al. |
| 4,399,371 A | 8/1983 | Ziff et al. |
| 4,462,656 A | 7/1984 | Beyer |
| 4,499,385 A | 2/1985 | Slavik |
| 4,520,417 A | 5/1985 | Frank |
| 4,575,714 A | 3/1986 | Rummel |
| 4,580,862 A | 4/1986 | Johnson |
| 4,706,159 A | 11/1987 | Hafner |
| 4,720,758 A | 1/1988 | Winslow |
| 4,731,549 A | 3/1988 | Hiddleson |
| 4,757,416 A | 7/1988 | Wilkerson |
| 4,760,276 A | 7/1988 | Lethellier |
| 4,985,806 A | 1/1991 | Mazzullo et al. |
| 5,037,322 A | 8/1991 | Adams et al. |
| 5,071,363 A | 12/1991 | Reylek et al. |
| 5,083,042 A | 1/1992 | Merchant |
| 5,138,185 A | 8/1992 | Weinstock |
| 5,157,273 A | 10/1992 | Medendorp et al. |
| 5,164,609 A | 11/1992 | Poppe et al. |
| 5,164,916 A | 11/1992 | Wu et al. |
| 5,172,008 A | 12/1992 | Odagiri |
| 5,199,892 A | 4/1993 | Campbell et al. |
| 5,203,711 A | 4/1993 | Bogiel |
| 5,203,712 A | 4/1993 | Kilpatrick et al. |
| 5,208,485 A | 5/1993 | Krinsky et al. |
| 5,270,576 A | 12/1993 | Kahle |
| 5,302,857 A | 4/1994 | Charles et al. |
| 5,359,540 A | 10/1994 | Ortiz |
| 5,401,175 A | 3/1995 | Guimond et al. |
| 5,424,903 A | 6/1995 | Schreiber |
| 5,436,788 A | 7/1995 | Wallaert |
| 5,481,607 A | 1/1996 | Hsiao |
| 5,572,438 A | 11/1996 | Ehlers et al. |
| 5,575,668 A | 11/1996 | Timmerman |
| 5,589,718 A | 12/1996 | Lee |
| 5,604,385 A | 2/1997 | David |
| 5,621,256 A | 4/1997 | Crane et al. |
| 5,637,933 A | 6/1997 | Rawlings et al. |
| 5,644,461 A | 7/1997 | Miller et al. |
| 5,673,022 A | 9/1997 | Patel |
| 5,684,469 A | 11/1997 | Toms et al. |
| 5,691,750 A | 11/1997 | Edwards |
| 5,708,551 A | 1/1998 | Bosatelli |
| 5,708,554 A | 1/1998 | Liner |
| 5,745,670 A | 4/1998 | Linde |
| 5,752,845 A | 5/1998 | Fu |
| 5,754,384 A | 5/1998 | Ashley |
| 5,781,744 A | 7/1998 | Johnson et al. |
| 5,815,353 A | 9/1998 | Schwenkel |
| 5,855,494 A | 1/1999 | Blaszczyk et al. |
| 5,880,677 A | 3/1999 | Lestician |
| 5,885,109 A | 3/1999 | Lee et al. |
| 5,909,100 A | 6/1999 | Watanabe et al. |
| 5,914,539 A | 6/1999 | Borgmann et al. |
| 5,921,783 A | 7/1999 | Fritsch et al. |
| 5,923,103 A | 7/1999 | Pulizzi et al. |
| 5,954,520 A | 9/1999 | Schmidt |
| 5,967,820 A | 10/1999 | Siegal et al. |
| 6,007,344 A | 12/1999 | Corrunker et al. |
| 6,028,267 A | 2/2000 | Byrne |
| 6,031,302 A | 2/2000 | Levesque |
| 6,046,513 A | 4/2000 | Jouper et al. |
| 6,049,143 A | 4/2000 | Simpson et al. |
| 6,157,555 A | 12/2000 | Hemena et al. |
| 6,162,062 A | 12/2000 | Liao |
| 6,179,665 B1 | 1/2001 | Rossman et al. |
| 6,184,483 B1 | 2/2001 | Coudert et al. |
| 6,211,796 B1 | 4/2001 | Toms et al. |
| 6,250,931 B1 | 6/2001 | Mendelson |
| 6,290,518 B1 | 9/2001 | Byrne |
| 6,330,176 B1 | 12/2001 | Thrap |
| 6,356,826 B1 | 3/2002 | Pohjola |
| 6,366,927 B1 | 4/2002 | Meek et al. |
| 6,379,164 B1 | 4/2002 | Cash, Jr. |
| 6,385,547 B1 | 5/2002 | Bogli |
| 6,417,657 B2 | 7/2002 | Azuma et al. |
| 6,420,877 B1 | 7/2002 | Replogle |
| 6,428,334 B1 | 8/2002 | Skarie et al. |
| 6,469,404 B1 | 10/2002 | Pohjola |
| 6,478,614 B1 | 11/2002 | De'Longhi |
| 6,497,579 B1 | 12/2002 | Garbini |
| 6,508,663 B1 | 1/2003 | Uusimaki |
| 6,552,888 B2 | 4/2003 | Weinberger |
| 6,558,177 B2 | 5/2003 | Havener et al. |
| 6,561,815 B1 | 5/2003 | Schmidt |
| 6,624,991 B2 | 9/2003 | Chu |
| 6,633,434 B2 | 10/2003 | Hollander |
| 6,633,472 B2 | 10/2003 | Lai |
| 6,642,852 B2 | 11/2003 | Dresti et al. |
| 6,660,950 B2 | 12/2003 | Fonseca |
| 6,700,333 B1 | 3/2004 | Hirshi et al. |
| 6,733,317 B2 | 5/2004 | Sato |
| 6,741,442 B1 | 5/2004 | McNally et al. |
| 6,768,225 B2 | 7/2004 | Chang et al. |
| 6,786,765 B2 | 9/2004 | Bauermeister et al. |
| 6,798,227 B1 | 9/2004 | Hwang |
| 6,808,405 B1 | 10/2004 | Uratani et al. |
| 6,813,525 B2 | 11/2004 | Reid et al. |
| 6,815,842 B2 | 11/2004 | Fehd et al. |
| 6,857,896 B2 | 2/2005 | Rupert et al. |
| 6,870,463 B2 | 3/2005 | Dresti et al. |
| 6,984,153 B2 | 1/2006 | Lai et al. |
| 6,993,417 B2 | 1/2006 | Osann, Jr. |
| 7,022,914 B1 | 4/2006 | Kiely |
| 7,058,482 B2 | 6/2006 | Fletcher et al. |
| 7,058,524 B2 | 6/2006 | Hayes et al. |
| 7,059,882 B2 | 6/2006 | Sugita et al. |
| 7,066,739 B2 | 6/2006 | McLeish |
| 7,075,769 B2 | 7/2006 | Rupert et al. |
| 7,090,521 B2 | 8/2006 | Nishio et al. |
| 7,099,966 B2 | 8/2006 | Chan et al. |
| 7,129,599 B2 | 10/2006 | Divan et al. |
| 7,141,891 B2 | 11/2006 | McNally et al. |
| 7,171,461 B2 | 1/2007 | Ewing et al. |
| 7,184,848 B2 | 2/2007 | Krzyzanowski et al. |
| 7,192,289 B2 | 3/2007 | Kowalski |
| 7,219,243 B2 | 5/2007 | Lim |
| 7,249,960 B2 | 7/2007 | Annecke et al. |
| 7,253,732 B2 | 8/2007 | Osann, Jr. |
| 7,259,950 B2 | 8/2007 | Chen |
| 7,262,943 B2 | 8/2007 | Stellato et al. |
| 7,264,479 B1 | 9/2007 | Lee |
| 7,269,521 B2 | 9/2007 | Hsu et al. |
| 7,311,526 B2 | 12/2007 | Rohrbach et al. |
| 7,311,541 B2 | 12/2007 | Chien et al. |
| 7,344,380 B2 | 3/2008 | Neidlein et al. |
| 7,351,066 B2 | 4/2008 | DiFonzo et al. |
| 7,380,142 B2 | 5/2008 | Lee et al. |
| 7,404,726 B1 | 7/2008 | Herring et al. |

(56) References Cited

U.S. PATENT DOCUMENTS

| | | | |
|---|---|---|---|
| 7,409,270 B2 | 8/2008 | Schibli et al. | |
| 7,424,569 B2 | 9/2008 | Matsuda | |
| 7,462,066 B2 | 12/2008 | Kohen | |
| 7,463,124 B2 | 12/2008 | DiSalvo et al. | |
| 7,467,948 B2 | 12/2008 | Lindenberg et al. | |
| 7,497,273 B2 | 3/2009 | Schoettle | |
| 7,500,862 B1 | 3/2009 | Herring et al. | |
| 7,500,882 B2 | 3/2009 | Goetz et al. | |
| 7,504,745 B2 | 3/2009 | Lee | |
| 7,517,222 B2 | 4/2009 | Rohrbach et al. | |
| 7,528,504 B2 | 5/2009 | Gerber | |
| 7,555,365 B2 | 6/2009 | Bhakta | |
| 7,576,448 B2 | 8/2009 | Goodrich | |
| 7,602,083 B1 | 10/2009 | Flegel et al. | |
| 7,606,014 B2 | 10/2009 | Ziegler et al. | |
| 7,607,920 B1 | 10/2009 | Chen | |
| 7,619,868 B2 | 11/2009 | Spitaels et al. | |
| 7,622,822 B2 | 11/2009 | Gelonese | |
| 7,641,476 B2 | 1/2010 | Didur et al. | |
| 7,641,477 B2 | 1/2010 | DiFonzo et al. | |
| 7,641,510 B2 | 1/2010 | Byrne | |
| 7,645,143 B2 | 1/2010 | Rohrbach et al. | |
| 7,648,379 B2 | 1/2010 | Johnson et al. | |
| 7,657,763 B2 | 2/2010 | Nelson | |
| 7,658,612 B2 | 2/2010 | Lee et al. | |
| 7,658,613 B1 | 2/2010 | Griffin et al. | |
| 7,697,268 B2 | 4/2010 | Johnson et al. | |
| 7,726,974 B2 | 6/2010 | Shah et al. | |
| 7,741,806 B2 | 6/2010 | Kuhlmann et al. | |
| 7,765,416 B2 | 7/2010 | Zhou | |
| 7,772,717 B2 | 8/2010 | Kitamura et al. | |
| 7,775,801 B2 | 8/2010 | Shiff et al. | |
| 7,800,252 B2 | 9/2010 | DuBose et al. | |
| 7,826,202 B2 | 11/2010 | Johnson et al. | |
| 7,834,486 B1 | 11/2010 | Flegel et al. | |
| 7,840,383 B2 | 11/2010 | Wang | |
| 7,841,776 B2 | 11/2010 | DiFonzo et al. | |
| 7,841,865 B2 | 11/2010 | Maughan et al. | |
| 7,888,821 B2 | 2/2011 | Flegel et al. | |
| 7,901,216 B2 | 3/2011 | Rohrbach et al. | |
| 7,905,737 B2 | 3/2011 | Byrne | |
| 7,905,749 B2 | 3/2011 | Cleveland | |
| 7,910,833 B2 | 3/2011 | McGinley et al. | |
| 7,940,504 B2 | 5/2011 | Spitaels et al. | |
| 7,960,648 B2 | 6/2011 | McGinley et al. | |
| 7,963,774 B2 | 6/2011 | Shift et al. | |
| 7,964,989 B1 | 6/2011 | Puschnigg et al. | |
| 7,965,174 B2 | 6/2011 | Wong et al. | |
| 7,973,425 B2 | 7/2011 | Chen | |
| 7,978,447 B2 | 7/2011 | Baxter | |
| 7,982,335 B2 | 7/2011 | Aldag | |
| 8,004,115 B2 | 8/2011 | Chapel et al. | |
| 8,022,664 B2 | 9/2011 | Shu | |
| 8,058,552 B2 | 11/2011 | Kruse et al. | |
| 8,087,939 B2 | 1/2012 | Rohrbach et al. | |
| 8,093,751 B1 | 1/2012 | Puschnigg et al. | |
| 8,105,091 B2 | 1/2012 | Nishihira et al. | |
| 8,108,695 B2 | 1/2012 | Love | |
| 8,138,626 B2 | 3/2012 | Jonsson et al. | |
| 8,140,279 B2 | 3/2012 | Subbloie | |
| 8,143,983 B1 | 3/2012 | Lauder et al. | |
| 8,172,588 B2 | 5/2012 | Johnson et al. | |
| 8,172,589 B2 | 5/2012 | Johnson et al. | |
| 8,174,149 B2 | 5/2012 | Chapel et al. | |
| 8,177,560 B2 | 5/2012 | Rohrbach et al. | |
| 8,207,627 B2 | 6/2012 | Aldag et al. | |
| 8,242,359 B2 | 8/2012 | McGinley et al. | |
| 8,242,868 B2 | 8/2012 | Lauder et al. | |
| 8,251,705 B2 | 8/2012 | Nishihira et al. | |
| 8,255,090 B2 | 8/2012 | Frader-Thompson et al. | |
| 8,265,776 B2 | 9/2012 | Osann, Jr. | |
| 8,275,561 B2 | 9/2012 | Alles | |
| 8,277,254 B2 | 10/2012 | Yamamoto | |
| 8,305,737 B2 | 11/2012 | Ewing et al. | |
| 8,335,936 B2 | 12/2012 | Jonsson et al. | |
| 8,350,406 B2 | 1/2013 | Byrne et al. | |
| 8,366,469 B2 | 2/2013 | Carnevali | |
| 8,374,729 B2 | 2/2013 | Chapel et al. | |
| 8,382,486 B2 | 2/2013 | Lee et al. | |
| 8,384,249 B2 | 2/2013 | Elberbaum | |
| 8,396,608 B2 | 3/2013 | Subbloie | |
| 8,398,409 B2 | 3/2013 | Schmidt | |
| 8,410,753 B2 | 4/2013 | Opolka | |
| 8,415,826 B2 | 4/2013 | Lee | |
| 8,427,007 B2 | 4/2013 | Jansma et al. | |
| 8,435,042 B2 | 5/2013 | Rohrbach et al. | |
| 8,503,149 B2 | 8/2013 | Spitaels et al. | |
| 8,514,042 B2 | 8/2013 | Lauder et al. | |
| 8,529,274 B2 | 9/2013 | Li et al. | |
| 8,535,088 B2 | 9/2013 | Gao et al. | |
| 8,558,408 B2 | 10/2013 | Carter | |
| 8,564,279 B2 | 10/2013 | Johnson et al. | |
| 8,596,881 B2 | 12/2013 | Umeno | |
| 8,602,795 B2 | 12/2013 | Hsu | |
| 8,604,914 B2 | 12/2013 | Clarke | |
| 8,622,629 B1 | 1/2014 | Umeno | |
| 8,622,756 B2 | 1/2014 | Smed | |
| 8,651,711 B2 | 2/2014 | Rudisill et al. | |
| 8,651,879 B2 | 2/2014 | Stiehl et al. | |
| 8,672,228 B1 | 3/2014 | Saini | |
| 8,680,709 B2 | 3/2014 | Byrne et al. | |
| 8,690,582 B2 | 4/2014 | Rohrbach et al. | |
| 8,696,366 B2 | 4/2014 | Chen et al. | |
| 8,702,316 B2 | 4/2014 | DiFonzo et al. | |
| 8,716,885 B2 | 5/2014 | Pfitzer et al. | |
| 8,734,165 B2 | 5/2014 | Neel | |
| 8,770,857 B2 | 7/2014 | DiFonzo et al. | |
| 8,790,120 B2 | 7/2014 | Wang et al. | |
| 8,798,801 B2 | 8/2014 | Subbloie | |
| 8,829,921 B2 | 9/2014 | Zhang | |
| 8,888,500 B2 | 11/2014 | Gao et al. | |
| 8,907,520 B2 | 12/2014 | Chapel et al. | |
| 8,915,609 B1 | 12/2014 | Shah et al. | |
| 8,992,241 B2 | 3/2015 | Genest et al. | |
| 9,004,930 B2 | 4/2015 | Gualino et al. | |
| 9,116,308 B2 | 10/2015 | Byrne | |
| 9,304,500 B2 | 4/2016 | McMahon | |
| 9,312,673 B2 | 4/2016 | Byrne et al. | |
| 9,484,751 B2 | 11/2016 | Byrne et al. | |
| 9,531,118 B2 | 12/2016 | Byrne et al. | |
| 9,652,014 B2 | 5/2017 | Warwick et al. | |
| 10,008,850 B2 | 6/2018 | Byrne et al. | |
| 10,175,996 B2 | 1/2019 | Byrne et al. | |
| 10,541,557 B2 | 1/2020 | Byrne et al. | |
| 10,621,113 B2 | 4/2020 | Byrne et al. | |
| 2002/0154528 A1* | 10/2002 | Ravid | H01R 31/065 363/146 |
| 2003/0038717 A1 | 2/2003 | Beaty | |
| 2003/0050737 A1 | 3/2003 | Osann, Jr. | |
| 2004/0009700 A1 | 1/2004 | Patel | |
| 2004/0130213 A1 | 7/2004 | Goldsholl | |
| 2005/0073199 A1 | 4/2005 | Jenkin | |
| 2005/0082915 A1 | 4/2005 | Steinberg | |
| 2005/0170672 A1 | 8/2005 | Lai et al. | |
| 2005/0184867 A1 | 8/2005 | Osann, Jr. | |
| 2005/0205543 A1 | 9/2005 | Meckler | |
| 2006/0152945 A1 | 7/2006 | Lantzsch et al. | |
| 2006/0194467 A1 | 8/2006 | Beasley et al. | |
| 2006/0250745 A1 | 11/2006 | Butler et al. | |
| 2006/0271314 A1 | 11/2006 | Hayes | |
| 2007/0086126 A1 | 4/2007 | Baxter | |
| 2007/0115695 A1 | 5/2007 | Lou et al. | |
| 2007/0155349 A1 | 7/2007 | Nelson et al. | |
| 2007/0184696 A1 | 8/2007 | Melot et al. | |
| 2007/0254510 A1 | 11/2007 | DeBey | |
| 2008/0015740 A1 | 1/2008 | Osann, Jr. | |
| 2008/0024605 A1 | 1/2008 | Osaan, Jr. | |
| 2008/0090432 A1 | 4/2008 | Patterson et al. | |
| 2008/0160810 A1 | 7/2008 | Ferguson et al. | |
| 2008/0164768 A1 | 7/2008 | Litwack | |
| 2008/0175256 A1 | 7/2008 | Binder | |
| 2008/0229819 A1 | 9/2008 | Mayleben et al. | |
| 2009/0045803 A1 | 2/2009 | Schoettle | |
| 2009/0058185 A1 | 3/2009 | Schoettle | |

(56) References Cited

U.S. PATENT DOCUMENTS

| | | |
|---|---|---|
| 2009/0091192 A1 | 4/2009 | Robertson et al. |
| 2009/0234512 A1 | 9/2009 | Ewing et al. |
| 2009/0239392 A1 | 9/2009 | Sumitomo et al. |
| 2009/0243847 A1 | 10/2009 | Chen |
| 2009/0261661 A1 | 10/2009 | Finneran |
| 2009/0267420 A1 | 10/2009 | Kristensen |
| 2009/0295233 A1 | 12/2009 | McGinley et al. |
| 2009/0323257 A1 | 12/2009 | Sarid et al. |
| 2010/0020452 A1 | 1/2010 | Gandolfi |
| 2010/0033024 A1 | 2/2010 | Orucs |
| 2010/0070217 A1 | 3/2010 | Shimada |
| 2010/0079001 A1 | 4/2010 | Lee et al. |
| 2010/0085894 A1 | 4/2010 | Johnson et al. |
| 2010/0096925 A1 | 4/2010 | Lee et al. |
| 2010/0144164 A1 | 6/2010 | Wang et al. |
| 2010/0145542 A1 | 6/2010 | Chapel et al. |
| 2010/0152912 A1 | 6/2010 | Huang |
| 2010/0191487 A1 | 7/2010 | Rada et al. |
| 2010/0214109 A1 | 8/2010 | Reynolds et al. |
| 2010/0225167 A1 | 9/2010 | Stair et al. |
| 2010/0238003 A1 | 9/2010 | Chan |
| 2010/0256828 A1 | 10/2010 | Wang |
| 2010/0280774 A1 | 11/2010 | Ewing et al. |
| 2010/0305773 A1 | 12/2010 | Cohen |
| 2010/0314226 A1 | 12/2010 | Patel et al. |
| 2010/0314942 A1 | 12/2010 | Talkin et al. |
| 2010/0328849 A1 | 12/2010 | Ewing et al. |
| 2011/0010006 A1 | 1/2011 | Tani et al. |
| 2011/0012427 A1 | 1/2011 | Craig et al. |
| 2011/0015795 A1 | 1/2011 | Boyer et al. |
| 2011/0022289 A1 | 1/2011 | Hofbauer |
| 2011/0028006 A1 | 2/2011 | Shah et al. |
| 2011/0029145 A1 | 2/2011 | Dong |
| 2011/0031806 A1 | 2/2011 | Altonen et al. |
| 2011/0072289 A1 | 3/2011 | Kato |
| 2011/0077788 A1 | 5/2011 | Chan et al. |
| 2011/0100702 A1 | 5/2011 | Hayes et al. |
| 2011/0101777 A1 | 5/2011 | Jansma |
| 2011/0109301 A1 | 5/2011 | Johnson et al. |
| 2011/0119515 A1 | 5/2011 | Sadwick et al. |
| 2011/0121660 A1 | 5/2011 | Azancot et al. |
| 2011/0141634 A1 | 6/2011 | Caamano et al. |
| 2011/0163600 A1 | 7/2011 | Garb et al. |
| 2011/0166710 A1 | 7/2011 | Kordik et al. |
| 2011/0182012 A1 | 7/2011 | Hilton et al. |
| 2011/0184581 A1 | 7/2011 | Storch et al. |
| 2011/0185194 A1 | 7/2011 | Lin et al. |
| 2011/0185198 A1 | 7/2011 | Ukita et al. |
| 2011/0185303 A1 | 7/2011 | Katagi et al. |
| 2011/0202193 A1 | 8/2011 | Craig et al. |
| 2011/0231320 A1 | 9/2011 | Irving |
| 2011/0260538 A1 | 10/2011 | Huang |
| 2011/0260555 A1 | 10/2011 | McGinley et al. |
| 2011/0282497 A1 | 11/2011 | Josephson et al. |
| 2012/0010833 A1 | 1/2012 | Alro |
| 2012/0028505 A1 | 2/2012 | Weber et al. |
| 2012/0049931 A1 | 3/2012 | Yamada |
| 2012/0059529 A1 | 3/2012 | Marivoet et al. |
| 2012/0078670 A1 | 3/2012 | Yamamura et al. |
| 2012/0080949 A1 | 4/2012 | Gelonese |
| 2012/0086562 A1 | 4/2012 | Steinberg |
| 2012/0089263 A1 | 4/2012 | Park et al. |
| 2012/0095610 A1 | 4/2012 | Chapel et al. |
| 2012/0096291 A1 | 4/2012 | Guang |
| 2012/0109395 A1 | 5/2012 | Finch et al. |
| 2012/0127637 A1 | 5/2012 | Byrne |
| 2012/0128078 A1 | 5/2012 | Billingsley et al. |
| 2012/0139341 A1 | 6/2012 | Jouper |
| 2012/0177322 A1 | 7/2012 | Schwandt et al. |
| 2012/0177323 A1 | 7/2012 | Schwandt et al. |
| 2012/0177324 A1 | 7/2012 | Schwandt et al. |
| 2012/0177325 A1 | 7/2012 | Schwandt et al. |
| 2012/0183258 A1 | 7/2012 | Schwandt et al. |
| 2012/0183259 A1 | 7/2012 | Schwandt et al. |
| 2012/0183260 A1 | 7/2012 | Schwandt et al. |
| 2012/0183261 A1 | 7/2012 | Schwandt et al. |
| 2012/0183262 A1 | 7/2012 | Schwandt et al. |
| 2012/0189155 A1 | 7/2012 | Gabara |
| 2012/0206090 A1 | 8/2012 | Hyun-Jun et al. |
| 2012/0252231 A1 | 10/2012 | Kall |
| 2012/0265361 A1 | 10/2012 | Billingsley et al. |
| 2012/0271471 A1 | 10/2012 | Lee et al. |
| 2012/0278640 A1 | 11/2012 | Caglianone |
| 2012/0295451 A1 | 11/2012 | Hyun-Jun et al. |
| 2012/0295483 A1 | 11/2012 | Smed |
| 2012/0303554 A1 | 11/2012 | Osann, Jr. |
| 2012/0316808 A1 | 12/2012 | Frader-Thompson et al. |
| 2012/0322323 A1 | 12/2012 | Fowler |
| 2013/0026853 A1 | 1/2013 | Chen et al. |
| 2013/0040470 A1 | 2/2013 | Gao et al. |
| 2013/0050958 A1 | 2/2013 | Bdeir |
| 2013/0058051 A1 | 3/2013 | Casey |
| 2013/0073060 A1 | 3/2013 | Dawley et al. |
| 2013/0083805 A1 | 4/2013 | Lu et al. |
| 2013/0088186 A1 | 4/2013 | Hsieh |
| 2013/0093249 A1 | 4/2013 | Chapel et al. |
| 2013/0099567 A1 | 4/2013 | Pfitzer |
| 2013/0144453 A1 | 6/2013 | Subbloie |
| 2013/0210244 A1 | 8/2013 | DiFonzo et al. |
| 2013/0323941 A1 | 12/2013 | Zeliff et al. |
| 2013/0343025 A1 | 12/2013 | Bdeir |
| 2014/0011375 A1 | 1/2014 | Lin |
| 2014/0049911 A1 | 2/2014 | Corbin et al. |
| 2014/0065846 A1 | 3/2014 | Poh et al. |
| 2014/0087569 A1 | 3/2014 | Lee |
| 2014/0087581 A1 | 3/2014 | Umeno |
| 2014/0099801 A1 | 4/2014 | Liao |
| 2014/0120746 A1 | 5/2014 | Persion et al. |
| 2014/0148018 A1 | 5/2014 | Kim |
| 2014/0153265 A1 | 6/2014 | Rudisill et al. |
| 2014/0162468 A1 | 6/2014 | Kim |
| 2014/0170864 A1 | 6/2014 | Hwang |
| 2014/0179126 A1 | 6/2014 | Gao et al. |
| 2014/0187057 A1 | 7/2014 | Murtagian et al. |
| 2014/0192494 A1 | 7/2014 | Liang et al. |
| 2015/0071675 A1 | 3/2015 | Suzaki |
| 2015/0088331 A1* | 3/2015 | Fiedler ............... H04L 12/2803 700/295 |
| 2015/0118868 A1 | 4/2015 | Choi et al. |
| 2015/0171649 A1 | 6/2015 | Kim et al. |
| 2015/0194764 A1 | 7/2015 | Magana et al. |
| 2015/0372430 A1 | 12/2015 | Foster |
| 2018/0181779 A1 | 6/2018 | Staraj et al. |
| 2019/0341712 A1* | 11/2019 | Byrne .................... H01R 13/73 |
| 2020/0212959 A1* | 7/2020 | Eriksen ............. H01R 13/7135 |

FOREIGN PATENT DOCUMENTS

| | | |
|---|---|---|
| CN | 101873009 | 10/2010 |
| CN | 101907870 | 12/2010 |
| CN | 201698189 | 1/2011 |
| CN | 202042678 | 11/2011 |
| CN | 202058982 | 11/2011 |
| CN | 202940398 | 5/2013 |
| CN | 203288885 | 11/2013 |
| FR | 2938383 | 5/2010 |
| GB | 2484658 | 4/2012 |
| JP | 7221581 | 8/1995 |
| WO | 2006009672 | 1/2006 |
| WO | 2010033563 A1 | 3/2010 |
| WO | 2012036713 | 3/2012 |
| WO | 2012036716 | 3/2012 |
| WO | 2012078526 | 6/2012 |
| WO | 2012106215 | 8/2012 |
| WO | 2012158616 | 11/2012 |
| WO | 2013003781 | 1/2013 |
| WO | 2013022899 | 2/2013 |
| WO | 2013165049 | 11/2013 |
| WO | 2014010781 | 1/2014 |

(56) References Cited

FOREIGN PATENT DOCUMENTS

| WO | 2014021847 | 2/2014 |
|----|------------|--------|
| WO | 2015168221 | 11/2015 |

OTHER PUBLICATIONS

Microchip Technology, Inc., "PIC12F675 Data Sheet" located at http://www.microchip.com/wwwproducts/Devices.aspx?dDocName=en010114, dated Apr. 30, 2010.
Excerpt of UL Household and Commercial Furnishings Standard 962, dated Jun. 11, 2010.
"MagSafe." Wikipedia, n.d. Web. Feb. 26, 2015. <http://en.wikipedia.org/wiki/MagSafe>, published on or before Feb. 23, 2015.
"Magnetic Connector Power Cord", <http://www.alibaba.com/showroom/magnetic-power-connector.html>, published on or before Feb. 26, 2015.

\* cited by examiner

OUTLET-LEVEL ELECTRICAL ENERGY MANAGEMENT SYSTEM

CROSS REFERENCE TO RELATED APPLICATION

The present application claims the benefit of U.S. provisional application Ser. No. 62/870,101, filed Jul. 3, 2019, which is hereby incorporated by reference in its entirety.

FIELD OF THE INVENTION

The present invention relates to electrical power distribution systems and outlets for use in work areas and the like.

BACKGROUND OF THE INVENTION

The need or desire to incorporate electrical power outlets in different locations has increased as portable electronic devices such as mobile phones, portable media players, laptop computers, and the like have proliferated, since these devices often require charging of onboard batteries. However, many of these locations are only occupied during a portion of each day, during which time the consumption of electricity is typically at its highest. Furthermore, significant energy may still be consumed during periods of little or no use of these locations. For example, even when computers, monitors, radios, and similar devices are switched off, they may still consume power in "standby" mode. Also, lights, space heaters, fans, and other devices that are left on during periods of non-use can consume significant amounts of energy, thus driving up utility costs.

SUMMARY OF THE INVENTION

The present invention provides an electrical power unit or receptacle assembly that includes a high voltage AC (e.g. 110V or 220V) electrical outlet mounted to a printed circuit board (PCB) that carries the electrical power to the outlet via electrical conductors. The high voltage AC electrical receptacle is at least mechanically coupled to the PCB (and in some cases also electrically coupled to the PCB), and has electrical contacts for receiving respective prongs of a male plug. The electrical power unit further includes a power control unit configured to selectively control the high voltage AC electrical outlet. The power control unit includes an electrical switch associated with the electrical conductors, and in response to the power control unit, the electrical switch is operable to open and close a portion of the electrical conductors and thereby selectively provide electrical power to the electrical contacts of the high voltage AC electrical receptacle. The power control unit may be configured to control the electrical switch in response to sensor data and control signals/data from a central controller.

In one form of the present invention, an electrical receptacle assembly includes a printed circuit board (PCB), a power control unit coupled to the PCB, electrical conductors disposed along the PCB and configured to conduct AC electrical current, and an electrical receptacle coupled to the PCB and comprising at least two outlet openings and at least two electrical contacts positioned behind each of the outlet openings. The electrical contacts are in electrical communication with respective ones of the electrical conductors. A first portion of the electrical conductors is coupled to a power source and a second portion of the electrical conductors is coupled to the respective ones of the electrical contacts. The power control unit includes a controller and a switch. The controller is configured to selectively place the switch into either a closed position or an open position. The closed position of the switch electrically couples together the first and second portions of the electrical conductors.

In another form of the present invention, an electrical receptacle assembly includes a housing defining an interior cavity and comprising at least two receptacle openings providing access to the interior cavity. The electrical receptacle assembly also includes a printed circuit board (PCB) disposed in the interior cavity, a high voltage AC electrical receptacle coupled to the PCB and comprising at least two electrical power contacts, at least two high voltage AC electrical conductors extending through the housing and into the interior cavity, and a power control unit comprising a controller and an electric switch. The high voltage AC electrical receptacle is arranged in one of the receptacle openings, and the electrical conductors are electrically coupled to respective ones of the electrical power contacts. The electrical switch of the power control unit is associated with the electrical conductors, and in response to the controller, the electrical switch is operable to open and close a portion of the electrical conductors and thereby selectively provide incoming high voltage AC electrical power to the electrical contacts of the AC electrical receptacle.

According to one aspect, the power control unit receives data from at least one sensor. The sensors may be included in the power control unit or external to the power control unit. Such sensors may include any of temperature sensors, occupancy sensors, humidity sensors, ambient light sensors, energy used (watts) sensors, and measured current level (amps) sensors. The controller may also monitor time of day and elapsed time.

According to another aspect, the power control unit includes a communications device configured to communicate with at least one of a central controller and external sensors. The central controller is configured to control a central power source and to monitor and provide input/data to a plurality of power control units, each disposed upon respective PCBs with corresponding AC electrical receptacles.

According to yet another aspect, the AC electrical receptacle is part of one of a simplex outlet and a duplex outlet.

According to yet another aspect, a low voltage DC electrical receptacle may be coupled to the generally planar portion of the PCB adjacent the high voltage AC electrical receptacle. Optionally, electrical converter circuitry is included and is configured to convert incoming high voltage AC electrical power to low voltage DC electrical power, which is directed along the PCB to the low voltage DC electrical receptacle.

Thus, the electrical receptacle assemblies of the present invention provide switchable high voltage AC electrical power outlets that are mounted to a PCB or similar panel or board, which may include electrical traces and/or support for circuitry such as an AC to DC electrical power converter. The electrical receptacle assemblies further include power control units that selectively control their associated high voltage AC electrical receptacles. A power control unit includes an electrical switch associated with electrical conductors configured to supply high voltage AC electrical power to one or more AC electrical receptacles. In response to the power control unit, the electrical switch is operable to open and close a portion of the electrical conductors and thereby selectively provide electrical power to electrical contacts of the one or more AC electrical receptacles. The power control unit may be configured to control the electrical switch in response to sensor data and control signals/data from a central controller.

These and other objects, advantages, purposes and features of the present invention will become apparent upon review of the following specification in conjunction with the drawings.

DESCRIPTION OF THE PREFERRED EMBODIMENTS

Referring now to the drawings and the illustrative embodiments depicted therein, an electrical power unit 10 includes one or more switchable high voltage AC electrical receptacles 12 mounted to a main printed circuit board (PCB) 14, and is designed to be robust, compact, and efficiently assembled. Although the described embodiments include PCB mounted electrical receptacles, it will be appreciated that the principles of the present invention may be applied to more conventional electrical receptacles that are self-contained within their own housings. Optionally, the electrical power units 10 may also be fitted with switchable low voltage DC power receptacles (such as USB receptacles) and/or electronic data receptacles 44, in addition to one or more switchable high voltage AC electrical receptacles 12. The electrical power units 10 described herein also include power control units 120 operable to selectively control the high voltage AC electrical receptacles 12. The power control units 120 include electrical switches 124 associated with electrical conductors configured to supply high voltage AC electrical power to the AC electrical receptacles 12. Responsive to a controller 122 of the power control unit 120, an electrical switch 124 is operable to open and close a portion of the electrical conductors and thereby selectively supply electrical power to electrical contacts of the AC electrical receptacles 12.

Figure 1A:
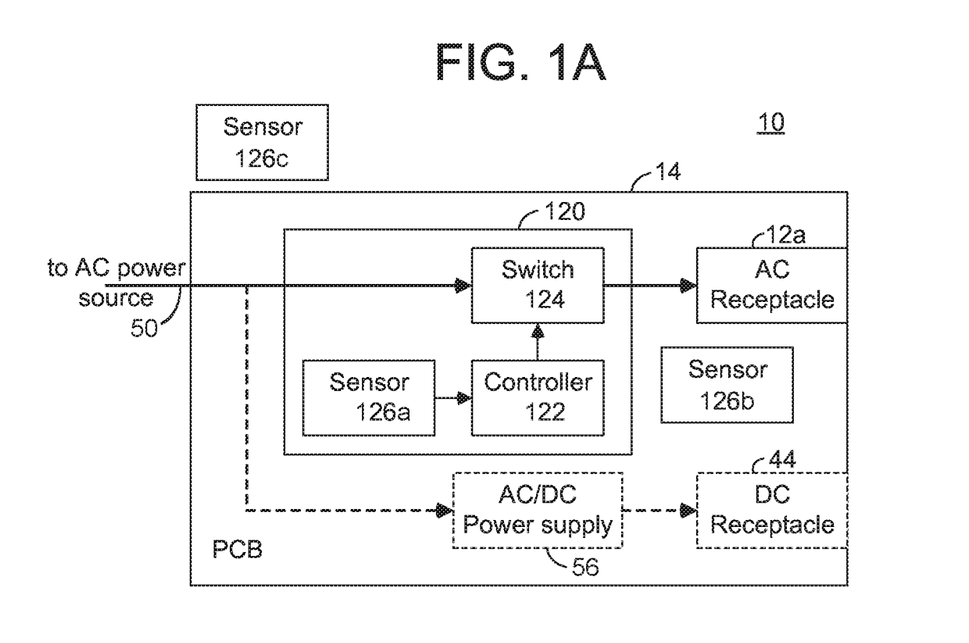
FIG. 1A is a block diagram of an electrical power unit including a PCB-mounted switchable high voltage AC electrical receptacle in accordance with the present invention.
Figure 1B:
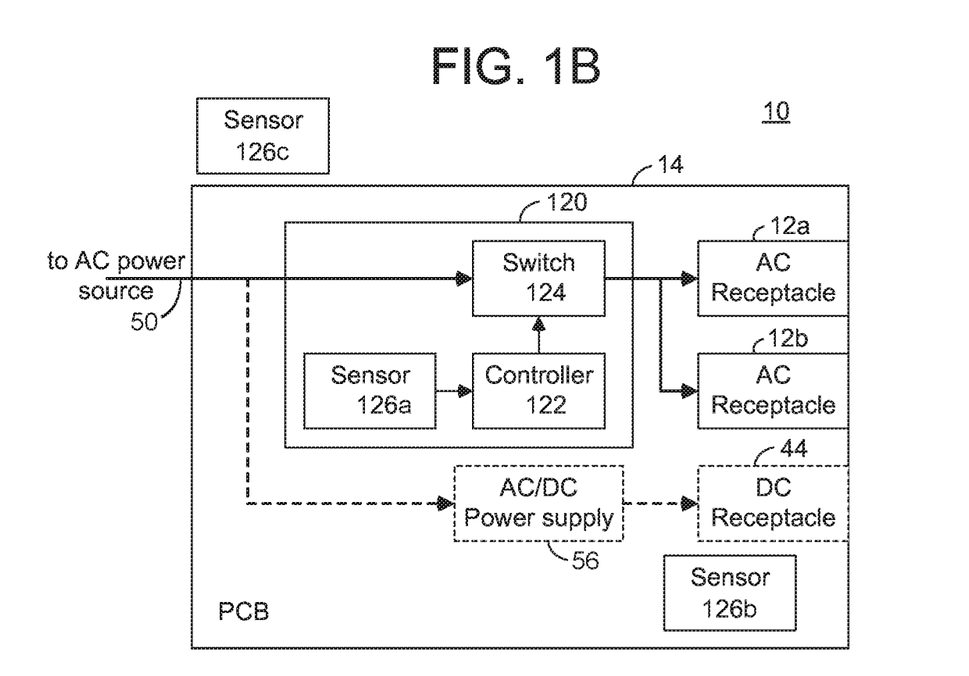
FIG. 1B is a block diagram of alternative electrical power unit including a pair of PCB-mounted switchable high voltage AC electrical receptacles in accordance with the present invention.
Figure 3:
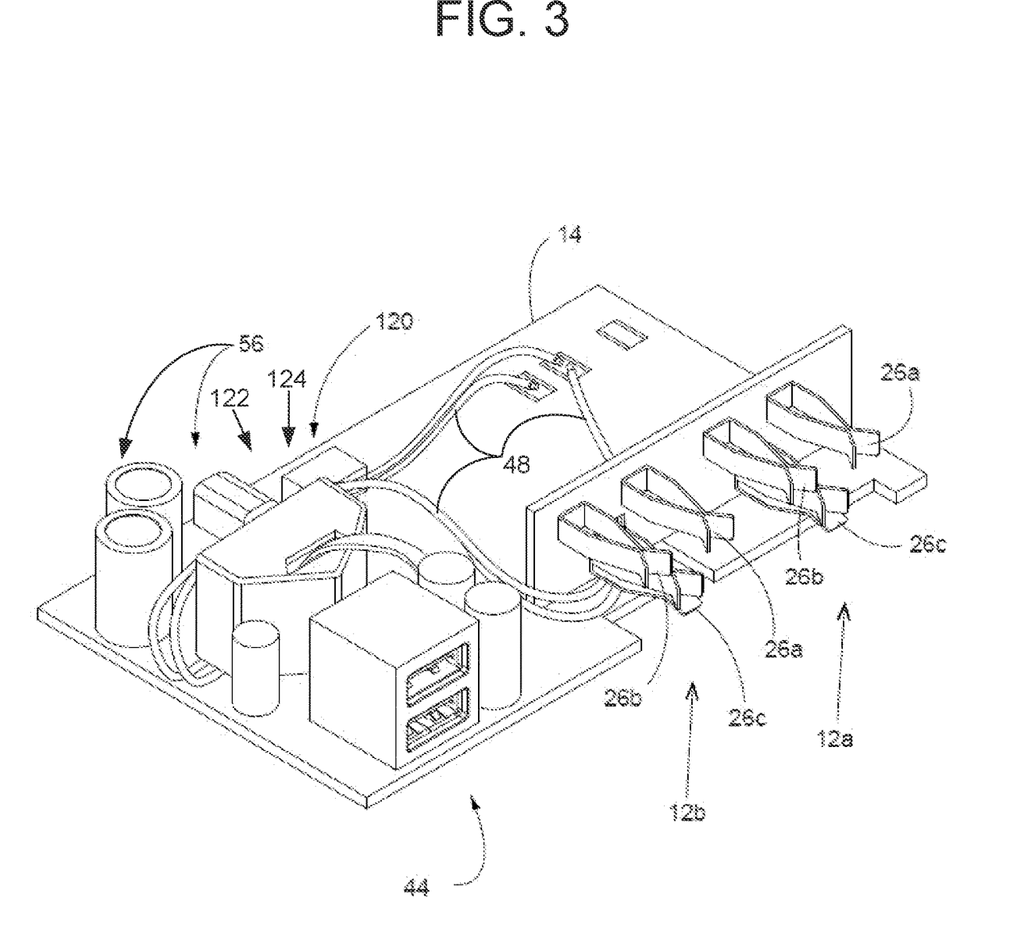
FIG. 3 is a perspective view of an electrical power unit including a power control unit associated with PCB-mounted switchable high voltage AC electrical receptacles in accordance with the present invention.

Referring to FIG. 1A, an exemplary electrical power unit or receptacle assembly 10 includes a high voltage AC electrical receptacle 12a coupled to a generally planar PCB 14. The PCB may include a non-conductive substrate that does not contain any circuitry or conductors embedded in the board material. FIGS. 3, 4, 5A, and 5B illustrate electrical conductors configured to supply power to AC electrical receptacles 12 that are implemented as either conductors 16a, 16b embedded in the generally planar PCB board material, or as wires 48. PCB-mounted high voltage AC electrical receptacles are more fully described in commonly-owned U.S. Pat. No. 10,965,049, which is hereby incorporated herein by reference in its entirety. While only a single AC electrical receptacle 12 is illustrated in FIG. 1A, other configurations with multiple AC electrical receptacles 12 are also anticipated, such as FIG. 1B, where a receptacle assembly 10 includes a pair of AC electrical receptacles 12a, 12b. One or more low voltage DC power receptacles 44 may also be arranged on the PCB 14. As illustrated in FIGS. 1A, 1B, and 3, the electrical power unit 10 may include a low voltage DC power receptacle 44 (e.g., a dual-output USB power receptacle) arranged alongside one or more AC electrical receptacles 12. The DC receptacle 44 receives low voltage DC via an AC/DC power supply or electrical converter 56 which is configured to convert the supplied high voltage AC power (via an AC power input 50) to a low voltage DC. The AC/DC power supply 56 may also be mounted on the PCB 14.

While FIG. 1B illustrates a single switch 124 controlling the power supplied to the pair of AC electrical receptacles 12a-b, alternative embodiments may comprise a pair of switches, with a separate switch for each respective AC electrical receptacle 12a-b. Multiple switches would provide for the individual selective control of the respective AC electrical receptacles 12a-b. Alternatively, the switch 124 is configured to separately control a plurality of AC electrical receptacles 12, such that a first AC electrical receptacle 12a is selectively supplied with power, while one or more other AC electrical receptacles 12 (e.g., the AC electrical receptacle 12b) are selectively not supplied with power.

Referring to FIGS. 1A and 1B, an exemplary power control unit 120 is configured to selectively power AC electrical receptacles 12a-b. The controller 122 is communicatively coupled to one or more sensors 126. Exemplary sensors 126 include one or more of temperature sensors, occupancy sensors, humidity sensors, ambient light sensors, and current sensors (e.g., energy used (watts) sensors and measured current level (amps) sensors). As illustrated in FIGS. 1A and 1B, exemplary sensors may include sensors 126a that are part of the power control unit 120, sensors 126b that are mounted to the PCB 14, or sensors 126c that are not mounted to the PCB 14 and may be communicatively coupled to the controller 122 via wired or wireless means. The sensors 126c may be referred to as external sensors.

Figure 2:
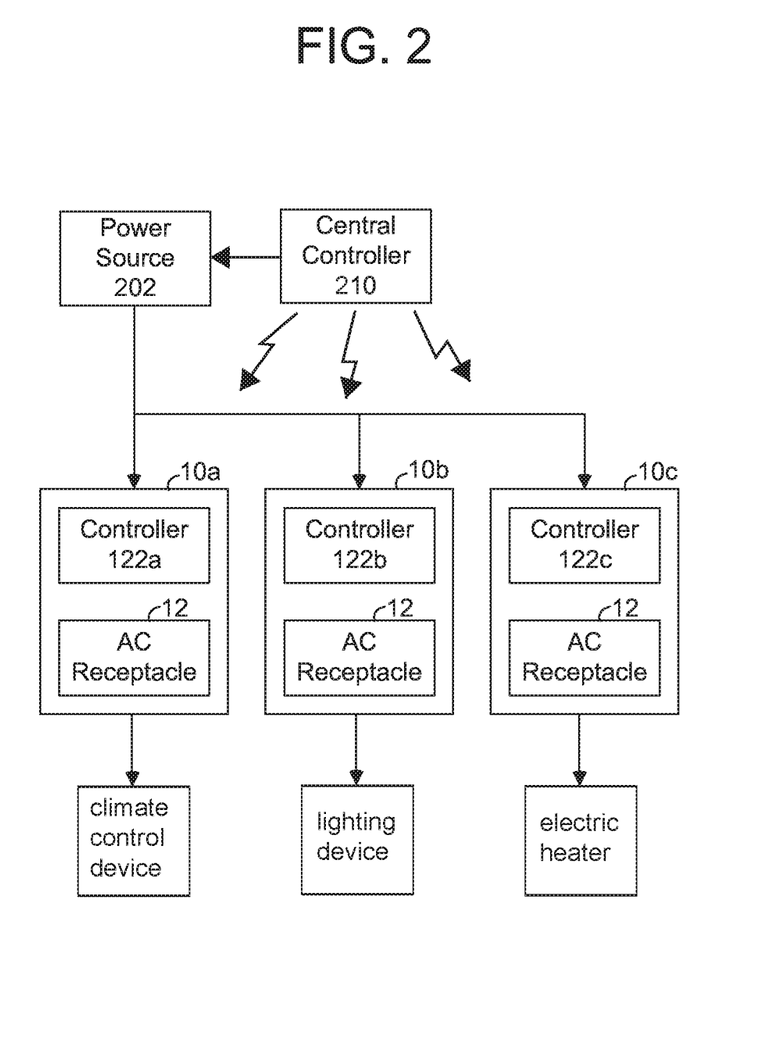
FIG. 2 is a block diagram of a plurality of the electrical power units of FIGS. 1A and 1B.

As illustrated in FIG. 2, a plurality of electrical power units 10a-c, coupled to a central power source 202, individually control their respective AC electrical receptacles 12. As discussed herein, the electrical power units 10a-c of FIG. 2 may include one or more AC electrical receptacles 12. An exemplary central controller 210 is configured to selectively control the power source 202, as well as provide data and/or control signals to the respective controllers 122a-c, such that the central controller 210 may influence or provide instructions to one or more of the electrical power units 10a-c. That is, the individual controllers 122a-c control their local AC electrical receptacle(s) 12, based upon local decisions made by the individual controllers 122a-c, as well as in response to data/control signals from the central controller 210. The central controller 210 may provide data/control signals to individual electrical power units 10a-c via wired or wireless communication means. A central controller providing control signals to electrical switches for selectively connecting and disconnecting one or more circuits (each comprising pluralities of AC electrical receptacles) from a power source is discussed in commonly-owned U.S. Pat. No. 9,652,014, which is hereby incorporated herein by reference in its entirety.

Thus, different electronic devices may be coupled to selected electrical power units 10a-c for AC electrical receptacle level control of those electronic devices. For example, a dehumidifier and/or air conditioner (i.e., a climate control device) may be coupled to the AC electrical receptacle 12 of electrical power unit 10a, while a series of lights or similar devices may be coupled to one or more AC electrical receptacles 12 of electrical power unit 10b, and a portable electrically powered heater may be coupled to the AC electrical receptacle of electrical power unit 10c. With the electrical power unit 10a receiving data from a humidity and/or temperature sensor 126, the controller 122a is operable to selectively power the climate control device responsive to the humidity and/or temperature levels sensed by the humidity and/or temperature sensor 126, respectively. Thus, the climate control device plugged into the AC electrical receptacle 12 of the electrical power unit 10a, will power ON/OFF responsive to the measured temperature and/or humidity level. Similarly, when the electrical power unit 10b includes or receives data from an occupancy sensor 126, the controller 122b is operable to selectively power the lighting device(s) responsive to the detection of a person entering within range of the occupancy sensor 126. Thus, the light device(s) plugged or wired to the AC electrical receptacle 12 of the electrical power unit 10b, will power ON/OFF responsive to the presence or absence, respectively, of a person entering or exiting a room or area containing the electrical power unit 10b. Lastly, when the electrical power unit 10c includes or receives data from a current sensor 126, the controller 122 is operable to selectively power the electric heater responsive to a current level (e.g., total watts consumed or an amperage level) measured by the current sensor 126. Thus, the electric heater plugged into the AC electrical receptacle 12 of the electrical power unit 10c, will disconnect power to the electric heater when a current level measured by the current sensor 126 is above a threshold current level. Additional sensor inputs may also be used. For example, the electrical power unit 10c may also additionally include or receive data from a temperature sensor 126 and use that data to control the electric heater. Alternatively, these sensor inputs may also be combined with additional functionality of their respective controllers 122a-c (as well as combined with data/control signals from the central controller 210). For example, the number of times a particular AC electrical receptacle 12 has been powered, a length of time the particular AC electrical receptacle 12 has been powered, or a current day of the week or time of day, may be used by the central controller 210 and/or the associated controller 122 as a further means of controlling the functionality of the associated AC electrical receptacle(s) 12.

Figure 4:
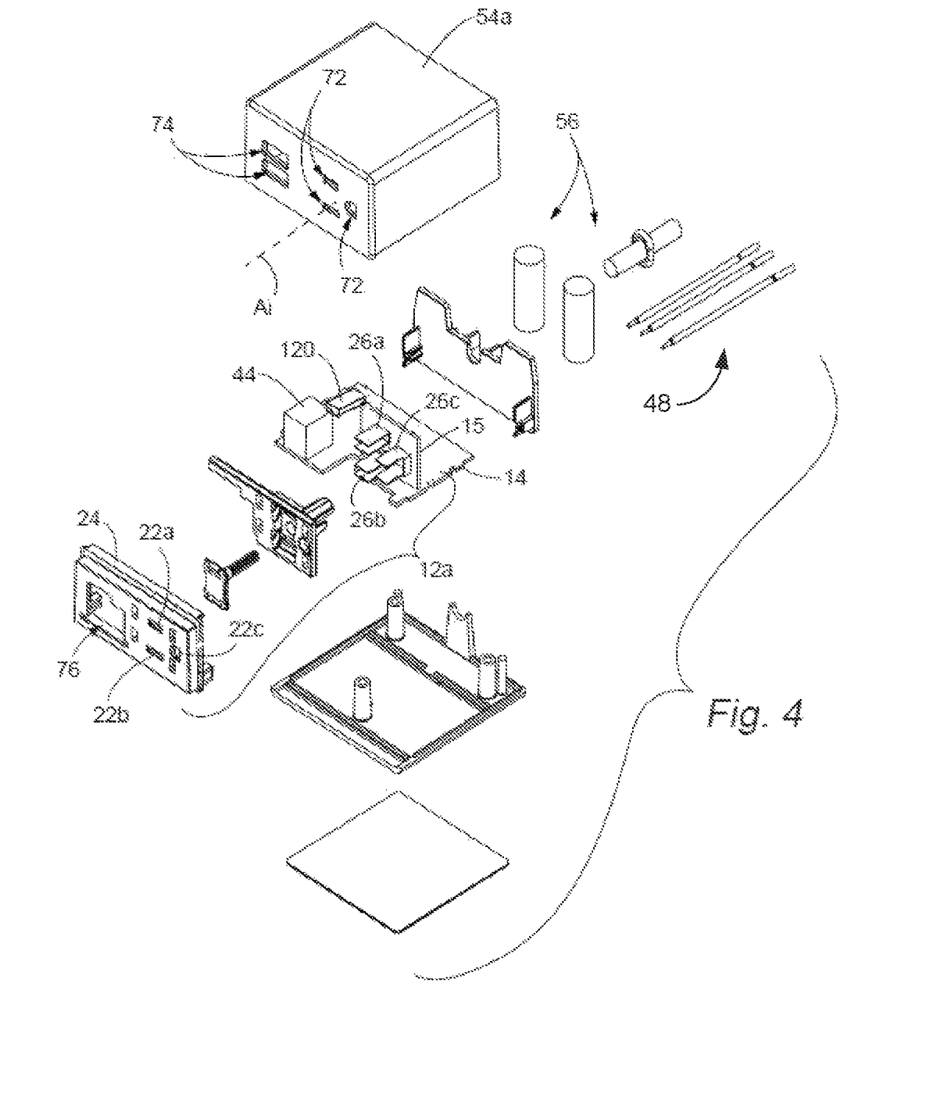
FIG. 4 is an exploded front perspective view of an exemplary electrical power unit including a power control unit associated with a PCB-mounted switchable high voltage AC electrical receptacle in accordance with the present invention.

Referring to FIG. 4, an exemplary electrical power unit's main housing 54a includes a front panel which includes or defines a plurality of AC electrical receptacle openings 72 that permit insertion of male prongs (not shown) into respective outlet openings 22a-c of an interior front face 24. Similarly, the main housing's front panel defines low voltage DC receptacle openings 74 that permit insertion of a compatible DC power plug, such as a USB plug (not shown). As illustrated in FIG. 4, each AC electrical receptacle 12 defines an insertion axis Ai that corresponds to the general alignment and insertion/removal direction of a male-prong electrical plug (not shown) that is compatible for engagement with the respective AC electrical receptacle 12. The insertion axis Ai is defined by outlet openings 22a-c formed in an interior face portion 24 of each AC electrical receptacle 12, and by the AC electrical receptacle's electrical contacts 26a-c that are recessed behind the outlet openings 22a-c and the interior face portion 24. A plug inserted through the DC receptacle openings 74 will pass through a DC outlet opening 76 formed in the interior front face 24 (FIG. 4), and into the low voltage DC electrical receptacle 44 that is mounted on the generally planar main PCB 14. As illustrated in FIG. 4, the insertion axis Ai is parallel to the generally planar main PCB 14. The electrical power unit 10 illustrated in FIG. 4 is described in more detail in the above-referenced U.S. Pat. No. 10,965,049.

Figure 5A:
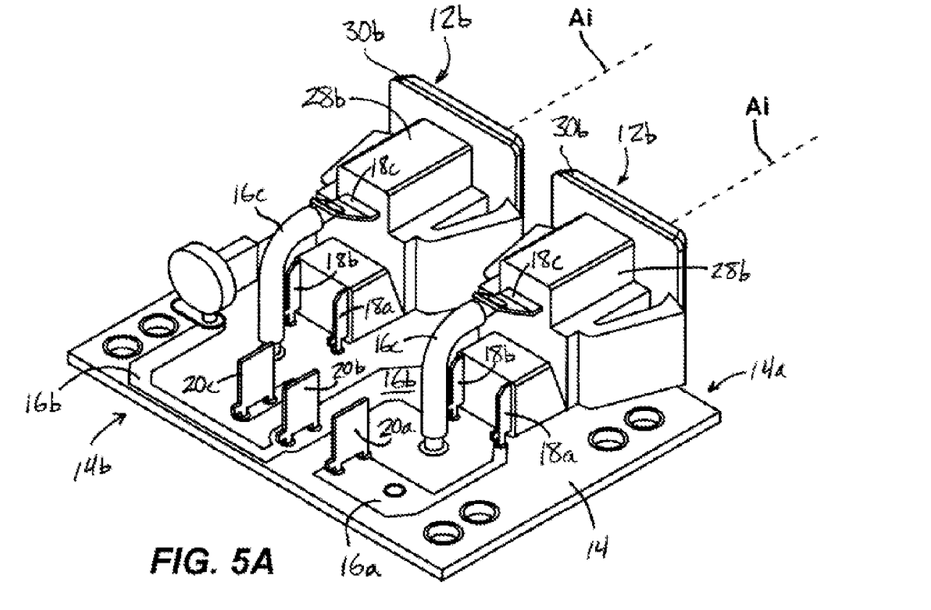
FIG. 5A is a rear perspective view of a pair of PCB-mounted high voltage electrical outlet assemblies.
Figure 5B:
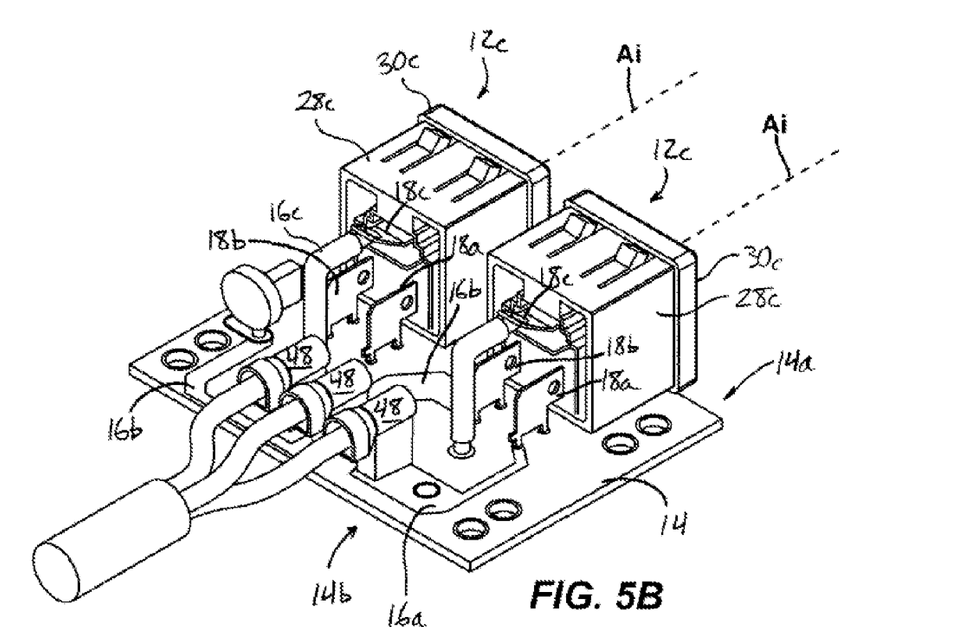
FIG. 5B is another rear perspective view of another pair of PCB-mounted high voltage electrical outlet assemblies, shown with electrical power supply conductors attached.

FIG. 3 provides an additional perspective view of an exemplary electrical power unit 10. A pair of AC electrical receptacles 12a-b are arranged on a generally planar PCB 14. Each AC electrical receptacle comprises corresponding electrical contacts 26a-c. The electrical power unit 10 also includes a low voltage DC power receptacle 44, which is supplied with low voltage DC via an AC-to-DC power supply or electrical converter 56. As illustrated in FIG. 1B, the electrical power unit 10 of FIG. 3 also includes a power control unit 120, which includes an electrical switch 124 associated with electrical conductors supplying electrical power to the AC electrical receptacles 12a-b. FIG. 3 illustrates the electrical conductors implemented as wires 48. As illustrated in FIGS. 5A and 5B, the electrical conductors may also be implemented as embedded conductors 16a, 16b embedded in the generally planar PCB board material. In response to a controller 122 of the power control unit 120, the electrical switch 124 is operable to open and close a portion of the electrical conductors and thereby selectively provide electrical power to the electrical contacts 26a-c of the AC electrical receptacles 12a-b.

In embodiments where more than one high voltage AC electrical receptacle 12 is provided, such as shown in FIGS. 5A, and 5B, the main PCB 14 includes, for each AC receptacle 12b, 12C, a high voltage AC "line" or "hot" conductor 16a in the surface of the PCB and connecting to a corresponding rear line terminal 18a at the back of AC receptacle 12, a high voltage AC "neutral" conductor 16b in the surface of the PCB and connecting to a corresponding rear neutral terminal 18b at the back of AC receptacle 12, and a flexible wire "ground" conductor 16c extending upwardly from the surface of the PCB to a corresponding rear ground terminal 18c at the back of AC receptacle 12. As shown in FIG. 5A, each conductor 16a-c has an end spaced away from the AC receptacle 12 that terminates in a respective blade-type electrical input terminal 20a-c extending upwardly or outwardly from the main PCB at a rear end portion 14b thereof. FIGS. 5A and 5B also illustrate the high voltage AC electrical receptacles 12b, 12c extending upwardly from a front end portion 14a of the main PCB 14, which is generally planar.

Referring to FIGS. 3, 4, 5A, and 5B, each AC receptacle 12a-c defines an insertion axis Ai that corresponds to the general alignment and insertion/removal direction of a male-prong electrical plug (not shown) that is compatible for engagement with the respective AC receptacle 12a-c. As can be seen in FIGS. 5A and 5B, the insertion axis Ai defined by the respective receptacles 12b, 12c is substantially parallel to the generally planar main PCB 14. This means that the mechanical loads of inserting and removing an electrical plug, relative to the AC receptacles 12b, 12c, can result in significant shear loads and bending moments between the AC receptacles 12b, 12c and the main PCB 14 to which a given receptacle is mounted, because the loads are generally parallel to (and spaced outwardly from) the main PCB 14.

In the embodiments of FIGS. 5A and 5B, the rear hot terminal 18*a* and rear neutral terminal 18*b* are secured to the main PCB in a manner that resists the loads imparted to the AC receptacles 12*b*, 12*c* during plug insertion and removal. Optionally, each receptacle 12*b*, 12*c* has a respective contact housing 28*b*, 28*c* that can be secured directly to the main PCB 14, and a front face 30*b*, 30*c* having a larger perimeter dimension than its contact housing 28*b*, 28*c*. This allows an outer housing panel of the electrical receptacle assembly (not shown), which has an opening sized and shaped to receive each contact housing 28*b*, 28*c*, to support the receptacles 28*b*, 28*c* against loads of plug insertion. In this arrangement, each front face 30*b*, 30*c* would be backed by a portion of the outer housing panel that frames or defines an opening surrounding at least a portion of each receptacle 12*b*, 12*c*. The front of the outer housing panel, where the outlet front faces 30*b*, 30*c* are located, also provides support for the AC receptacles 12*b*, 12*c* in directions that are orthogonal to the insertion axis Ai, such as due to side loads or vertical loads applied to a male-prong plug that is already inserted into the AC receptacle 12*b*, 12*c*.

Therefore, the exemplary electrical power unit provides convenient access to selectable high voltage AC electrical power, and optionally to low voltage DC power, in a compact package that is robust and durable, which utilizes conductors on a PCB to carry high voltage AC power to PCB-mounted selectable high voltage AC electrical receptacles. The electrical power unit selectively controls the AC electrical receptacles via a PCB-mounted power control unit, which is configured to control an electrical switch for connecting and disconnecting the supplied high voltage AC electrical power to the AC electrical receptacles. The power control unit may be further configured to control the electrical switch in response to sensor data and commands from a central controller.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical receptacle assembly comprising:
   a printed circuit board (PCB);
   at least two electrical conductors disposed along said PCB, wherein said at least two electrical conductors are each configured to conduct high voltage AC electrical current;
   a high voltage AC electrical receptacle coupled to said PCB, said AC electrical receptacle comprising at least two outlet openings and at least two electrical contacts positioned behind each of said outlet openings, wherein said electrical contacts are in electrical communication with respective ones of said electrical conductors, and wherein a first portion of said electrical conductors is in electrical communication with a power source and a second portion of electrical conductors is in electrical communication with respective ones of said electrical contacts; and
   a power control unit coupled to said PCB and comprising a controller and an electrical switch, wherein the controller is configured to selectively place the electrical switch into either a closed position or an open position, and wherein the closed position of the electrical switch electrically couples the first portion of said electrical conductors to the second portion of said electrical conductors.

2. The electrical receptacle of claim 1 further comprising one or more sensors including any of temperature sensors, occupancy sensors, humidity sensors, ambient light sensors, current consumption sensors, and current level sensors, and wherein said controller is configured to selectively place said electrical switch into the closed or open position based upon outputs of said one or more sensors.

3. The electrical receptacle of claim 1, wherein said controller is further configured to monitor at least one of time of day and elapsed time, and wherein said controller is configured to selectively place said electrical switch into the closed or open position based upon the monitored time of day or elapsed time.

4. The electrical receptacle of claim 1, wherein said PCB comprises a generally planar portion, wherein said at least two electrical conductors are disposed along said generally planar portion of said PCB, wherein said AC electrical receptacle is coupled to said generally planar portion of said PCB, wherein said outlet openings and said electrical contacts cooperate to define an insertion axis, and wherein said insertion axis is substantially parallel to said planar portion of said PCB.

5. The electrical receptacle of claim 1, wherein said AC electrical receptacle comprises one of a simplex outlet and a duplex outlet.

6. The electrical receptacle of claim 1 further comprising a second high voltage AC electrical receptacle coupled to said PCB, and at least two additional high voltage electrical conductors disposed along said PCB and providing electrical continuity from the second portion of said electrical conductors to respective ones of electrical contacts of said second AC electrical receptacle.

7. The electrical receptacle of claim 1 further comprising a low voltage DC electrical receptacle coupled to said PCB adjacent said AC electrical receptacle.

8. The electrical receptacle of claim 7 further comprising an electrical converter and configured to convert incoming high voltage AC electrical power from said electrical conductors to low voltage DC electrical power, wherein said low voltage DC electrical power is directed along said PCB to said low voltage DC electrical receptacle.

9. An electrical receptacle assembly comprising:
   a housing defining an interior cavity and comprising at least two receptacle openings providing access to said interior cavity;
   a printed circuit board (PCB) disposed in said interior cavity;
   a high voltage AC electrical receptacle coupled to said PCB and comprising at least two electrical power contacts, wherein said AC electrical receptacle is arranged in one of said receptacle openings;
   at least two high voltage AC electrical conductors extending through said housing and into said interior cavity, wherein said electrical conductors are electrically coupled to respective ones of said electrical power contacts; and
   a power control unit comprising a controller and an electric switch, wherein said electrical switch is associated with said electrical conductors, and in response to said controller, said electrical switch is operable to selectively open and close a portion of each of said electrical conductors and thereby selectively provide incoming high voltage AC electrical power to said electrical contacts of said AC electrical receptacle.

10. The electrical receptacle of claim 9 further comprising one or more sensors including any of temperature sensors, occupancy sensors, humidity sensors, ambient light sensors, current consumption sensors, and current level sensors, and wherein said controller is configured to selectively place said electrical switch into the closed or open position based upon outputs of said one or more sensors.

11. The electrical receptacle of claim 9, wherein said controller is further configured to monitor at least one of time of day and elapsed time, and wherein said controller is configured to selectively place said electrical switch into the closed or open position based upon the monitored time of day or elapsed time.

12. The electrical receptacle of claim 9, wherein said PCB comprises a generally planar portion, wherein said at least two electrical conductors are disposed along said generally planar portion of said PCB, wherein said AC electrical receptacle is coupled to said generally planar portion of said PCB, wherein said receptacle openings and said electrical contacts cooperate to define an insertion axis, and wherein said insertion axis is substantially parallel to said planar portion of said PCB.

13. The electrical receptacle of claim 9, wherein said AC electrical receptacle comprises one of a simplex outlet and a duplex outlet.

14. The electrical receptacle of claim 9 further comprising a low voltage DC electrical receptacle coupled to said PCB adjacent said AC electrical receptacle, wherein said housing defines a DC receptacle opening providing access to said low voltage DC electrical receptacle in said interior cavity.

15. The electrical receptacle of claim 14 further comprising an electrical converter coupled to said housing and configured to convert the incoming high voltage AC electrical power from said electrical conductors to low voltage DC electrical power, wherein said low voltage DC electrical power is directed along said PCB to said low voltage DC electrical receptacle.

16. The electrical receptacle of claim 9 further comprising a second high voltage AC electrical receptacle coupled to said PCB, and at least two additional high voltage electrical conductors disposed along said PCB and providing electrical continuity from said electrical switch to respective ones of electrical contacts of said second AC electrical receptacle, and wherein said electrical switch is configured to selectively open and close a portion of each of said additional electrical conductors and thereby selectively provide the high voltage AC electrical power to the electrical contacts of said second AC electrical receptacle.

* * * * *